Sept. 10, 1963     F. E. MARTINEZ     3,103,335
UNITARY CLAMP MEANS FOR FLEXIBLE TUBES
Filed March 28, 1961
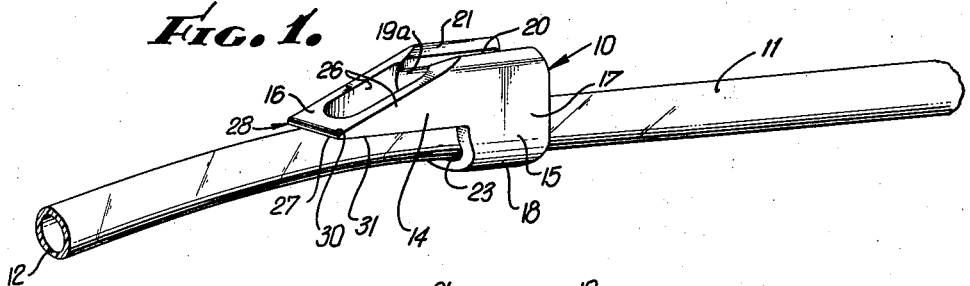
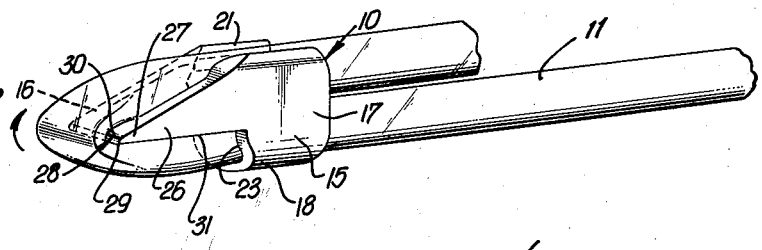
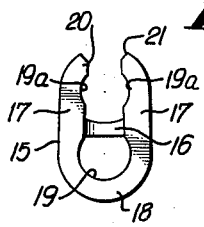
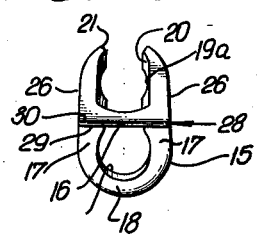
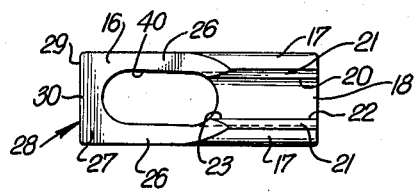
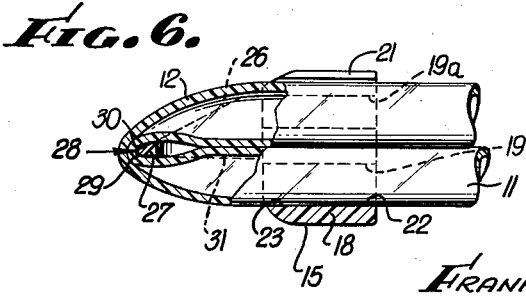
INVENTOR.
FRANK E. MARTINEZ
BY Miketta and Glenny
ATTORNEYS.

United States Patent Office 3,103,335
Patented Sept. 10, 1963

3,103,335
UNITARY CLAMP MEANS FOR
FLEXIBLE TUBES
Frank E. Martinez, Covina, Calif., assignor to Resiflex
Laboratories, Inc., Los Angeles, Calif., a corporation
of California
Filed Mar. 28, 1961, Ser. No. 98,930
1 Claim. (Cl. 251—4)

This invention relates to a clamp means for use with a tubular member and more particularly relates to a unitary one-piece integral non-modulating clamp means adapted to be slidably positionable upon a tubular member conducting fluid such as an enema tube for positively shutting off flow of fluid by folding the tube upon itself and retaining the tube in such folded relation.

Prior proposed clamping means for such tubes usually comprised a pair of opposed clamp edges which were employed to squeeze or clamp together walls of a tube passing between the clamp edges. In some instances the clamp edge included spaced edges of a slot between which was positioned a tube. In other instances such prior proposed clamp surfaces were provided on pivotally movable members so that the clamp edges could be moved into tight clamping relation with a tube passing between the clamp edges. Usually such prior proposed clamp means were independent of the tubular member and had to be located for each clamping application and were generally not readily available.

Such prior proposed clamping means for tubular members of flexible compliant and resilient material required substantial application of force in order to bring the interior surfaces of the tubular member into sealing contact in order to positively shut off flow of fluid through the tubular member. Clamping pressure was resisted by the thickness of the wall material of the tubular member at the edges of the clamping zone and it was often difficult to provide a leakproof closure.

The present invention contemplates a unitary one-piece clamping means for tubular members of flexible compliant material wherein the clamp means is carried by the tubular member in slidable relation thereto so that the clamp means can be positioned at any selected point along the length of the tubular member and effect a closure. The present invention also contemplates a clamp means wherein only one clamp edge is employed and wherein the material of the tubular member is permitted to assist in effecting a closure. The clamp means of the present invention is designed and constructed to obviate many of the disadvantages of prior proposed clamp means for this purpose and to be relatively inexpensive and simple to manufacture.

The main object of this invention therefore is to design and provide a unitary one-piece clamp means for a tubular member and employing only a single clamp edge.

An object of the invention is to disclose and provide a clamp means adapted to be slidably carried by a tubular member and to effect a closure of the tubular member at any selected portion of its length.

Another object of the invention is to disclose and provide a clamp means including a tube holding means and a tube closure means, said tube holding means being arranged to permit slidable positioning of the clamp means on a tubular member.

Another object of the invention is to disclose and provide a clamp means wherein a tube closure means is spaced from a tube holding means and includes a single closure or clamp edge adapted to provide a surface or support about which the tubular member may be back-folded.

A further object of the invention is to disclose and provide a clamp means for a flexible compliant tubular member wherein the clamp means includes an integral one-piece clamp member having a tube holding portion of U-section, the walls of said U-section being extended longitudinally and interconnected by a transversely disposed closure or clamp edge portion about which a tubular member extending through said U-section may be folded to effect a closure thereof.

A more specific object of this invention is to disclose and provide a clamp means as mentioned above wherein the tube holding means includes a pair of curved surface means in spaced relation for frictionally grasping and retaining portions of a tubular member said surface means being disposed in relation to a closure edge spaced therefrom so that a tubular member folded about said edge will be retained in a position to effect a closure of the tubular member.

Various other objects and advantages of the present invention will be readily apparent from the following description of the drawings in which an exemplary embodiment of this invention is shown.

In the drawings:

FIG. 1 is a perspective view of a clamp means embodying this invention and associated with a tubular member.

FIG. 2 is a perspective view showing the tubular member associated with the clamp means folded to effect closure of the tubular member.

FIG. 3 is an end view of the clamp means shown in FIG. 1.

FIG. 4 is a top view of said clamp means.

FIG. 5 is a front view of said clamp means.

FIG. 6 is a sectional view taken in a plane longitudinally bisecting the clamp means and tubular member shown in FIG. 2.

In the drawings a clamp means 10 embodying this invention is illustrated in association with a tubular member 11 of flexible compliant material. The tubular member 11 may be of an extruded plastic composition material suitable for medical and hospital purposes. For example, the tubular member shown may be an enema tube. The tubular member 11 may have a wall section 12 of any selected thickness and may have an outer diameter or OD and an inner diameter or ID of preselected dimension. It will be understood that the tubular member may be made of other materials and that the construction and operation of the clamp means of this invention may be employed with other tubular members which are generally flexible, compliant and are capable of retaining their generally cylindrical or tubular shape.

The clamp means 10 may comprise an integral one-piece molded clamp member 14 made of any suitable material such as a thermosetting or thermoplastic composition material. The clamp means 10 comprises a clamp member 14 having at one end a tube holding means 15 and at the other end a tube closure or clamp edge means 16. The tube holding means 15 may be formed with a U-portion defined by spaced side walls 17 interconnected by a curved bottom wall 18. The bottom section of said U-portion is adapted to hold and retain a portion of the tubular member 11 by means of internal part-cylindrical surfaces 19 which extend through an arc greater than 180°. The diameter of said part-cylindrical surfaces may be approximately equivalent to the OD of the tubular member 11 and define an axis extending longitudinally of the clamp member 14.

The internal surfaces of the side walls 17 may also be formed with a pair of longitudinally extending concave faces 19a formed about a longitudinally extending axis spaced from the axis defined by the part-cylindrical surfaces 19 a distance approximately equivalent to the OD of tubular member 11. The side walls 17 of the tube holding and retaining means 15 may be disposed in slightly converging relation to define a slot or opening 20 extending longitudinally of the clamp member 14. Top edges of the side walls 17 may be provided with a bevel or chamfer as at 21 to facilitate entry of a back-folded portion of a tubular member into and through the slot 20.

The tube holding means 15 of U-section thus provides at one end an end opening 22 and at its other end an end opening 23 lying to one side of the tube closure edge means 16. A tubular member 11 may be passed through said openings and to the said one side of the tube closure means 16 so as to slidably associate the clamp means with the tubular member. It will be apparent that when the tube is in open position and by slightly cocking the tubular member with respect to the axis of the clamp member the clamp member may be readily slidably moved along the tube into a selected position.

The tube closure edge means 16 may be provided by an extension of said side walls 17, said extension including extension walls 26 integral with side walls 17, of generally triangular shape, and terminating at their distal ends in an integral transverse closure or clamp edge portion 27. The extension walls 26, transverse closure portion 27, and the proximate edges of side wall 17 and bottom wall 18 define an elongated aperture 40 through which tubular member 11 freely passes when in cocked or misaligned relation with respect to the holding means 15. The clamp edge portion 27 may be provided with a clamp edge face 28 forming a relatively sharp transverse edge 29 and a somewhat curved return edge 30. The edge 29 is at the free end of the longitudinally extending edge faces 31 on the triangular extension walls 26, said edge faces 31 lying generally parallel to the axis of the clamp member and defining with said edge 29 a longitudinally extending plane which intersects the part-cylindrical surfaces 19 between the spaced axes defined by the part-cylindrical surfaces 19 and the curved concave faces 19a. The relative positions of the part-cylindrical surfaces 19 and the edge 29 thus make it apparent that the main portion of a tubular member passing through openings 22 and 23 will be slightly bent outwardly away from the tube closure edge means 16 and will thus assure positive pressure contact of the edge face 28 against opposed wall surfaces on the tubular member 11.

The operation of clamp means 10 may be briefly described as follows. It will be understood that the tubular member 11 is inserted through opening 22 and out of opening 23 to one side of the closure edge means 16. The clamp means 10 may then be readily slidably positioned along the length of the tubular member to a location where it is desired that closure of the tubular member be effected. During such slidably positioning of the clamp means the axis of the tubular member is generally misaligned with the longitudinal axis of the clamp member as mentioned hereinabove. At the selected location for closure of the tubular member the main body portion of the tubular member may be moved by a finger into axial alignment with the part-cylindrical surfaces 19. The part-cylindrical surfaces 19 thus serve to frictionally grasp, retain and hold the main body portion of the tubular member which is normally filled with fluid being conducted by the member in generally axial alignment with the axis of the part-cylindrical surfaces 19. The free end portion of the tubular member which extends beyond the closure edge means 16 may then be grasped and folded or back-folded about the edge face 28. During such back-folding the opposed surfaces of the walls of the tubular member are positively pressed against the relatively sharp edge 29 on said edge face 28 and opposite wall portions of the tubular member are placed under tension as the free end is back-folded. The free end portion of tubular member 11 may be pressed through the slot 20 and is frictionally grasped and retained by the concave surfaces 19a on side walls 17. In such back-folded relation it may be noted that the axes of the tubular portions held by the part-cylindrical surfaces 19 and the concave surfaces 19a are in virtually parallel relation and the tubular portions of member 11 are in contact with each other.

At the closure edge means 16 it will be readily apparent that the relatively sharp edge 29 presses into the opposed wall surfaces of the tubular member. The outer portions of the tubular member which pass over the edge face 28 are stretched and placed under tension so that their internal faces are urged toward the opposed internal surfaces of the opposite wall section which is supported and restrained against movement by the edge face 28. A positive leak-tight closure is thus effected.

It may be noted that the edge face 28 is spaced from opening 23 of the tube holding means 15 a distance slightly greater than twice the OD of the tubular member 11. It will be understood that the spacing of the clamp edge face 28 from the tube holding means may vary. A distance of approximately one OD of the tubular member would be too short because sufficient space would not be provided for back-folding the tubular member with effective retention of the free end thereof in the concave surfaces 19a. Spacing of edge face 28 a great distance from the tube holding portion would permit too great flexibility of the portion of the tubular member between the edge face and opening 23 so that greater longitudinal or tensioning forces would be required to hold the tubular member in closed position on the clamp means.

It will be understood that since the portion of the tubular member contained by the part-cylindrical surfaces 19 will normally be filled with fluid and that a fluid pressure will be imposed upon the walls of the tubular member. Thus the offsetting of the plane of the edge 28 with respect to the plane passing midway between the axes of the back-folded portion of the tubular member and the main portion of the tubular member provides a positive pressure contact of edge 28 with the tubular member so as to effect a positive closure.

Various modifications and changes may be made in the structure of the clamp means described above which come within the spirit of this invention and all such modifications and changes coming within the scope of the appended claim are embraced thereby.

I claim:

An integral unitary clamp means for use with a tubular member of selected external diameter and of flexible compliant material comprising: a clamp member having a tube receiving and retaining generally U-portion, the bottom section of said U-portion being provided with internal part-cylindrical surfaces of greater than 180° for receiving a tubular member, the upper section of said U-portion having opposed concave faces parallel to the part-cylindrical surfaces for retaining a back-folded portion of the tubular member; the axes about which said surfaces and faces are formed being parallel and spaced approximately the external diameter of the tubular member; and an extension on said U-portion including spaced walls integral with said upper section of said U-portion and a transverse wall interconnecting said spaced walls, said transverse wall presenting a narrow edge lying in a plane intersecting the part-cylindrical surface and disposed parallel to the axis thereof, said edge being spaced from the proximate end of the U-portion approximately four times the radius of the part-cylindrical surface whereby a tubular member extending through the U-portion and back-folded about said transverse edge is retained in closed position with said back-folded tube portion held with its axis virtually parallel to the axis of the part-cylindrical surfaces and spaced therefrom approximately a distance equivalent to an external diameter of the tubular member.

References Cited in the file of this patent

UNITED STATES PATENTS

| | | |
|---|---|---|
| 470,776 | Beehler | Mar. 15, 1892 |
| 2,396,906 | Windson | Mar. 19, 1946 |
| 2,603,237 | Van Hyning | July 15, 1952 |
| 2,684,674 | Archer | July 27, 1954 |
| 2,869,816 | Olander | Jan. 20, 1959 |

FOREIGN PATENTS

| | | |
|---|---|---|
| 36,527 | Germany | of 1886 |